Jan. 3, 1956    N. R. WILD ET AL    2,729,786
MEANS FOR TREATING SUBSTANCES
Filed Dec. 17, 1945    2 Sheets-Sheet 1
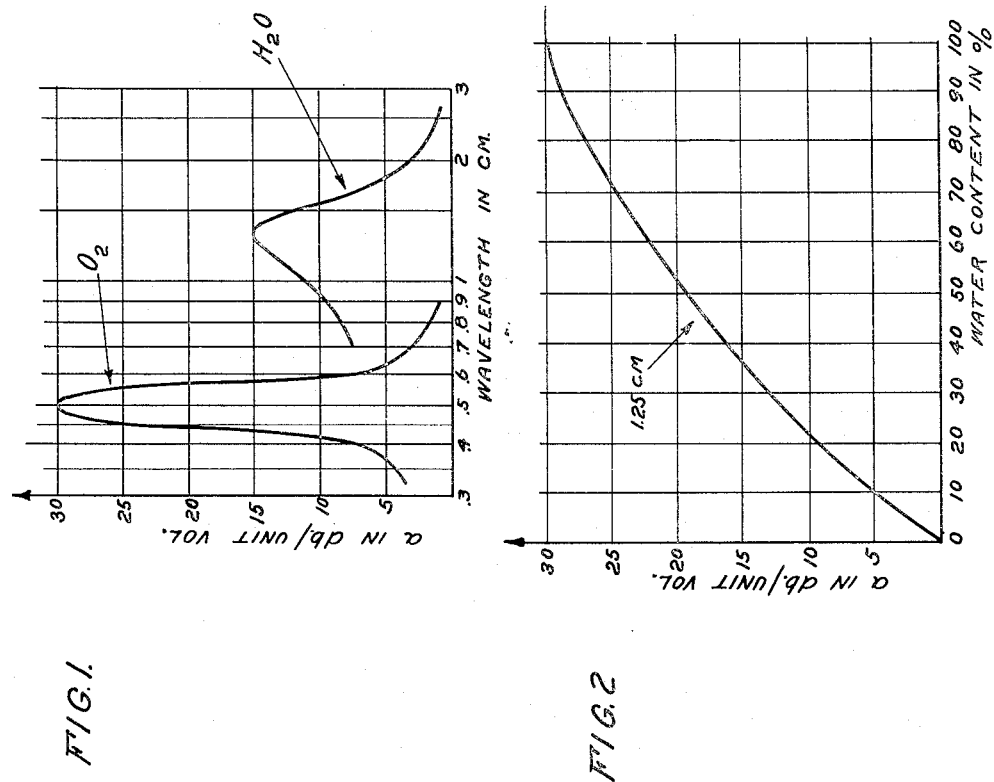
INVENTORS
NORMAN R. WILD
HUSTON W. COCKRILL
BY Elmer J. Go—
ATTY.

United States Patent Office 2,729,786
Patented Jan. 3, 1956

2,729,786

MEANS FOR TREATING SUBSTANCES

Norman R. Wild, East Natick, and Huston W. Cockrill, Auburndale, Mass., assignors to Raytheon Manufacturing Company, Newton, Mass., a corporation of Delaware Application December 17, 1945, Serial No. 635,560

9 Claims. (Cl. 324—58.5)

This invention relates to the treatment of dielectric materials, either in pure form or in mixture with other materials, especially, but not exclusively, for the detection or identification thereof, for the measurement or control of the quantity thereof, or for other purposes which will hereinafter become more apparent.

As an illustration of one of the problems which may be solved by means of the present invention, let us consider the measurement of the water content of wheat during its processing in the manufacture of flour. For various reasons, it is desirable that the miller be able to measure water content to within .1 per cent weight. Now, wheat is brought to the mills from various parts of the country and stored in unheated bins. The quantitative chemical composition of the wheat coming from different parts of the country varies. Inasmuch as wheat is a good heat insulator, it attains ambient temperature slowly, and, inasmuch as the wheat berries vary in salt and water content, the amount of salt going in and out of solution varies as a function of temperature. It becomes desirable, therefore, to precisely control temperature if the water content is to be measured by either resistance or reactance methods, as has heretofore been the case. But, because of the heat insulating properties of the wheat, rapid and accurate measurement by such methods becomes impracticable.

This is true because, as salt goes in and out of solution with changes in temperature, either the resistance or the dielectric constant, and hence, the reactance, changes. The effect registers itself as a change of the same type as that brought about by water, and gives rise to errors of considerable magnitude.

Control of the temperature is most difficult because of the heat insulating property of the wheat. Compensation for temperature changes is likewise difficult because reactance changes on a differential increment basis. Resistance methods of measurement are of no value because they are based on the path of least resistance and do not, therefore, provide a water content indication of the entire sample under test.

It is, therefore, an object of the present invention to provide methods of and means for treating a substance, for example, water, whereby the amount of said substance present in a sample under observation may be rapidly and accurately determined.

It is another object of the present invention to provide methods of and means for treating a substance whereby its presence can be detected, it can be easily identified, and the quantity thereof can be controlled.

These, and other objects of the present invention, which will become more apparent as the detailed description thereof progresses, are attained, briefly, in the following manner.

It has been observed that, at certain critical frequencies in about the microwave region of the spectrum, electromagnetic energy is strongly absorbed by various dielectric materials. For example, there is a marked attenuation by water of electromagnetic energy of a wavelength of 1.25 centimeters. There is a marked attenuation by oxygen of electromagnetic energy of a wavelength of .5 centimeter. These phenomena indicate that, at some definite wavelength in about the microwave region, characteristic of the nature of the material involved, probably, between about .1 millimeter and about 1.5 centimeters, dielectric materials selectively absorb electromagnetic energy. This is believed to be a resonance phenomenon associated with dielectric materials in their molecular form.

As used throughout this specification, "molecular form" is intended to mean one or more molecules of a substance whether in the gaseous, liquid, or solid state.

The present invention takes advantage of the foregoing to detect the presence of or identify any given substance. If, upon exposing a given substance to electromagnetic energy of a frequency corresponding to the resonant frequency of said substance, a marked attenuation of the energy occurs, the conclusion is that said substance is one previously known to have the resonant frequency employed in the test. If an unknown substance is successively exposed to a plurality of frequencies within the band contemplated, and at some particular frequency a marked attenuation of the energy occurs, determination of that particular frequency identifies the substance.

It has been further observed that the absorption or attenuation is a function of the quantity of the material under test. Therefore, by determining the amount of said adsorption, the quantity of the material becomes known.

In the illustrative embodiment of the present invention to be hereinafter described in detail, wherein water content of some substance, for example, wheat, is to be determined, electromagnetic energy of approximately the resonant frequency of water, namely 24,000 mc./sec., is passed through the test load. The power level of the energy fed to the load is maintained constant, and the power of the attenuated energy is measured to determine the extent of the absorption by the load. The measuring equipment is protected against the effects of changes in ambient temperature in the vicinity of the load, so that the indication obtained is due solely to the quantity of the water present in the load. Preferably, the measuring equipment is calibrated directly in terms of per cent water.

In the accompanying specification there shall be described, and in the annexed drawings shown, an illustrative embodiment of the method and means of the present invention. It is, however, to be clearly understood that the present invention is not to be limited to the details herein shown and described for purposes of illustration only, inasmuch as changes therein may be made without the exercise of invention, and within the true spirit and scope of the claims hereto appended.

In said drawings,

Fig. 1 is a graph illustrating the resonance principles hereinbefore discussed as applied to water and oxygen;

Fig. 2 is a graph illustrating the hereinbefore-discussed effect of the quantity of the material on the magnitude of the attenuation.

Figure 3:
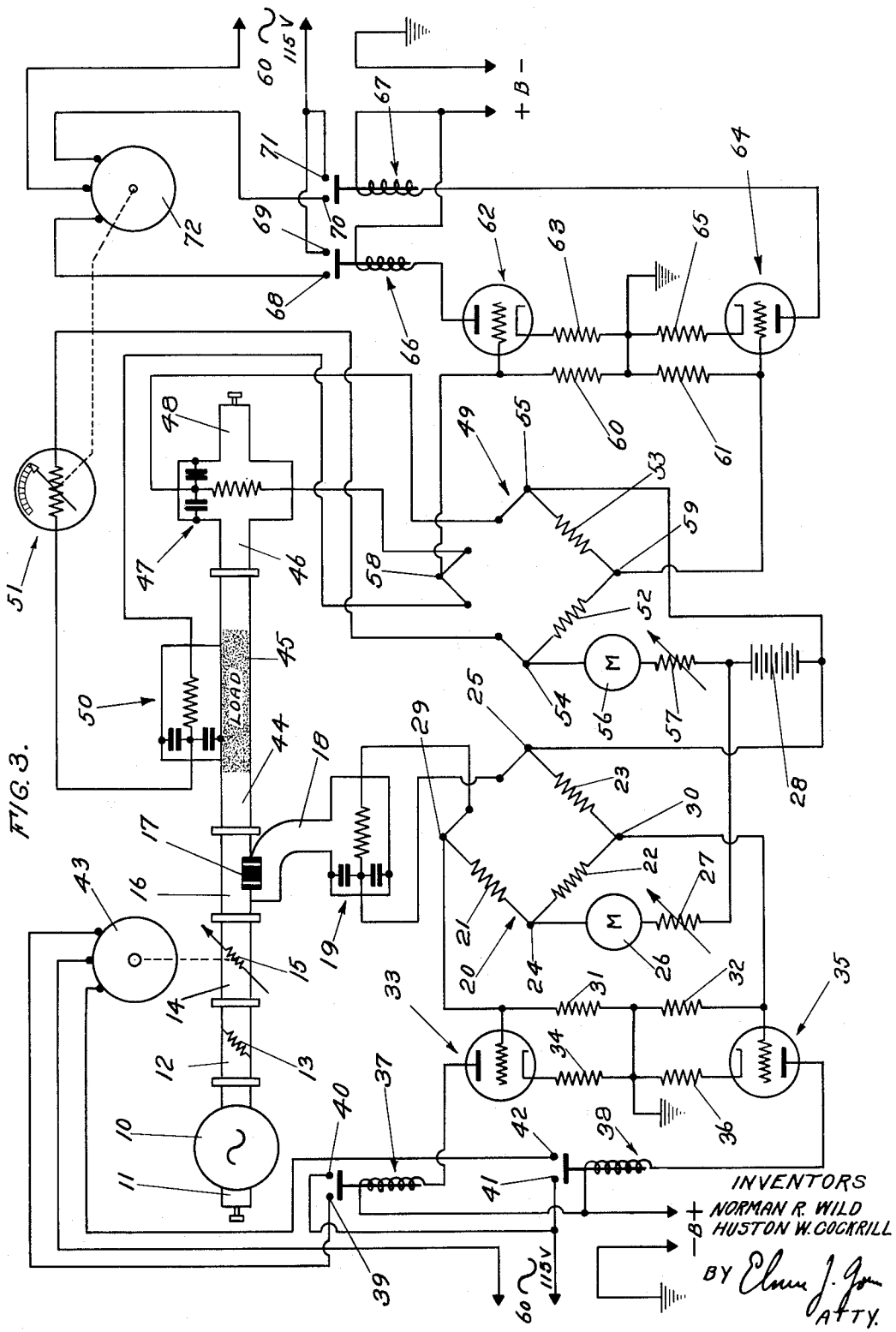
Fig. 3 is a schematic diagram of a moisture content measuring system assembled in accordance with the principles of the present invention.

Referring now more in detail to the aforesaid illustrative embodiment of the present invention, with particular reference to Fig. 1 of the drawings, there are shown two curves, one relating to water, and the other relating to oxygen. These curves indicate the attenuation of electromagnetic energy, in decibels per unit volume of any material containing water or oxygen, as a function of the wavelength of said energy. It is to be understood, however, that, except insofar as said curves indicate wavelengths at which maximum attenuations are obtained, they are only approximate, and are intended merely to illustrate the strongly selective character of the attenuation. Maximum attenuation by water occurs at a wavelength of 1.25 centimeters, and maximum attenuation by oxygen occurs at a wavelength of .5 centimeter. It is believed, on the basis of the observations resulting in these curves, that, at some wavelength within a band extending upward from about the long-wave end of the region of the far infrared, possibly, to about the middle of the hyper frequency or microwave region, or even somewhat higher, dielectric materials exhibit this absorption characteristic.

In Fig. 2 of the drawings there is shown a plot of attenuation of electromagnetic energy of a wavelength corresponding to the observed resonant frequency for water, namely, 1.25 centimeters, as a function of the water content of a unit volume of a test substance, said water content being indicated in per cent by weight. It will be noted that the attenuation is fairly linear, so that it is relatively easy to calibrate any attenuation measuring equipment, such as will hereinafter be described in detail, directly in terms of water content.

Reference is now made to Fig. 3 of the drawings, wherein there is shown a specific system employing the principles of the present invention as applied to the measurement of the water content of a substance such as wheat.

The numeral 10 designates any suitable oscillator for generating electromagnetic energy of one or more wave lengths within a band extending from about .1 millimeter to about 1.5 centimeters, in the specific case under consideration, the single wavelength of approximately 1.25 centimeters. Said oscillator is, preferably, provided with an adjustable phasing stub 11 for assuring the maximum transfer of the energy generated into a wave-guide section 12, the latter being provided with an appropriate fixed attenuator 13, whereby said oscillator is isolated from the load to be hereinafter described.

The energy from the wave-guide sections 12 is conveyed to a wave-guide section 14 provided with a variable attenuator 15, adjustment of which, as will now be described, assures the maintenance of a constant power level in the energy fed to the above referred to load.

For this purpose, the energy from the wave-guide section 14 is conveyed to a wave-guide section 16 and, through a unidirectional coupler 17, to a wave-guide section 18. The coupling 17 is designed to permit the passage, into the wave-guide section 18, only of energy coming from the oscillator 11, rejecting any energy reflected from the load.

The wave-guide section 18 terminates in a thermally-responsive device 19, for example, a barreter including a resistance element having a high, positive temperature coefficient of resistance, the instantaneous resistance of said element being a function of the instantaneous radio-frequency power dissipated therein. The thermally-responsive device 19 is connected in a Wheatstone bridge 20 which includes, in addition to said device 19, a resistor 21 in series with the latter, and series-connected, equal resistors 22 and 23 in parallel with the resistor 21 and said device 19. The value of the resistor 21 is, of course, equal to the resistance value of the device 19 at the power level which it is desired to maintain constant.

The input terminals 24 and 25 of the bridge 20 are connected, in series with a current meter 26 and a variable resistor 27, across a D.-C. voltage source 28, and the output terminals 29 and 30 of said bridge are connected to ground, respectively, through resistors 31 and 32.

When the above-described bridge is balanced, no output appears across either of the resistors 31 and 32. Should the power flowing through the wave-guide section 16 increase, the resistance of the thermally-responsive device 19 increases, causing the bridge terminal 29 to go positive with respect to the terminal 30, the current flowing between these terminals making the upper end of the resistor 31 positive with respect to ground. Should said power decrease, the resulting decrease in the resistance of the device 19 will cause the terminal 29 to go negative with respect to the terminal 30, the current flowing between these terminals making the lower end of the resistor 32 positive with respect to ground.

The bridge output across the resistor 31 is applied to a vacuum tube 33 normally biased approximately to cut-off by a cathode resistor 34. The bridge output across the resistor 32 is applied to a vacuum tube 35, likewise normally biased approximately to cut-off by a cathode resistor 36.

The anodes of the tubes 33 and 35 are connected, respectively, through electromagnetic relays 37 and 38, to the positive terminal of a B-voltage supply, the negative terminal of said B-voltage supply being grounded.

The relay 37 controls a circuit through a pair of contacts 39 and 40, and the relay 38 controls a circuit through a pair of contacts 41 and 42. The contacts 40 and 41 are connected to one terminal of a 60-cycle, 115 volt source, the other terminal of said source being connected to the neutral terminal of a reversible A.-C. motor 43 whose drive shaft, as indicated by the broken line, is mechanically coupled to the variable attenuator 15. The contacts 39 and 42 are connected to the motor 43 to drive the same in opposite directions.

Thus, when the tube 33 conducts, the relay 37 bridges the contacts 39 and 40 to drive the motor 43 in such direction as to increase the attenuation of the power flowing through the wave-guide section 14, and thereby restore the bridge 20 to a condition of balance and, when the tube 35 conducts, the motor 43 is driven in an opposite direction, to decrease the attenuation of the power, and, again, thereby restore the bridge 20 to a condition of balance. As a result of the described operation of the bridge 20, and the mechanisms associated therewith, the power fed to the load now to be described is maintained at a constant level.

The output of the wave-guide section 16 feeds into a wave-guide section 44 which is adapted to receive a test load 45 of any material whose water content it is desired to measure, for example, wheat. As indicated in earlier portions of this specification, the electromagnetic energy passing through the load 45 will suffer a marked attenuation, the magnitude of said attenuation being indicative of the water content of the load. In order to measure this attenuation, the residual energy is conveyed to wave-guide section 46 which terminates in a thermally-responsive device 47, the latter being similar to the thermally-responsive device 19, and being provided with an adjustable phasing stub 48 for assuring the complete dissipation of said residual energy in said device 47.

The device 47 is connected in a Wheatstone bridge 49 which, in addition to said device, comprises still another thermally-responsive device 50 in series with a potentiometer 51 and said device 47, and a pair of series-connected, equal resistors 52 and 53 in parallel with said devices 47 and 50, and said potentiometer 51. Both thermally-responsive devices 47 and 50 are located in the vicinity of the load 45, so that any changes in ambient temperature which affect the load likewise affect the devices 47 and 50, and become cancelled out in the bridge 49. It is to be noted, however, that, while the resistance of the device 47 is affected by the radio-frequency energy dissipated therein in addition to any changes in ambient temperature, the device 50 is not exposed to any radio-frequency energy, and is affected only by changes in ambient temperature. Therefore, any unbalanced condition in the bridge 49 will be due solely to the residual energy absorbed by the thermally-responsive device 47.

The input terminals 54 and 55 of the bridge 49 are connected, in series with a current meter 56 and a variable resistor 57, across the D.-C. voltage source 28, and the output terminals 58 and 59 of the bridge are connected to ground, respectively, through resistors 60 and 61.

The bridge output across the resistor 60 is applied to a vacuum tube 62 which is normally biased approximately to cut-off by a cathode resistor 63, and the bridge output across the resistor 61 is applied to a vaccum tube 64, likewise biased approximately to cut-off by a cathode resistor 65.

The anodes of the tubes 62 and 64 are connected to the positive terminal of the hereinbefore referred to B-voltage supply, respectively, through electromagnetic relays 66 and 67. The relay 66 controls a circuit through a pair of contacts 68 and 69, and the relay 67 controls a circuit through a pair of contacts 70 and 71.

The contacts 69 and 71 are connected to one terminal of the hereinbefore referred to A.-C. source, the other terminal of said A.-C. source being connected to the neutral terminal of a reversible motor 72, the shaft of which is mechanically coupled, as indicated by the broken line, to the variable arm of the potentiometer 51. The contact 68 is connected to the motor 72 so that, when the relay 66 operates, corresponding to an unbalancing of the bridge 49 in one direction, said motor is driven to operate the potentiometer 51 in such a direction as to restore a condition of balance, and the contact 70 is connected to the motor 72 so that, when the relay 67 operates, corresponding to an unbalancing of the bridge in the opposite direction, said motor is driven to operate said potentiometer in the opposite direction to again restore a condition of balance.

Before the load 45 is placed in the wave-guide section 44, the oscillator 10 is put into operation, and the entire output thereof, minus the power absorbed by the fixed attenuator 13 and the variable attenuator 15, is dissipated in the thermally-responsive device 47, greatly increasing the resistance of said device 47. This unbalances the bridge 49 by making the terminal 58 appreciably positive with respect to the terminal 59, causing current to flow such as to make the upper end of the resistor 60 positive with respect to ground. The resulting operation of the tube 62 causes the relay 66 to bridge the contacts 68 and 69, thereby driving the motor 72 in a direction to increase the resistance of the potentiometer 51 until its resistance, plus that of the thermally-responsive device 50, is equal to the increased resistance of the thermally-responsive device 47. The bridge 49 is then in balance, and the potentiometer may be calibrated on a suitable scale for zero attenuation, corresponding to zero per cent water. By then feeding different amounts of power through the system, for example, by manually adjusting the variable attenuator 15, the potentiometer 51 may be completely calibrated in terms of per cent water.

Now, when a test load is placed in the wave-guide section 44, the amount of energy absorbed thereby will be readable on the calibrated potentiometer 51 directly in the aforesaid terms of per cent water.

Instead of merely measuring the water content of the load 45, the quantity thereof can be controlled by applying the output of the bridge 49 to suitable apparatus for injecting or removing water from the test load.

This completes the description of the aforesaid illustrative embodiment of the present invention, including its mode of operation as applied to the determination of the water content of a test load. It will be noted from all of the foregoing that the present invention provides a rapid and accurate system for measuring water or other content of any given substance; it provides a system for determining the mere presence of any given substance; it enables the identication of unknown substances in a sample mixture; and it enables the control of the quantity of any given substance in any given test sample. In addition, inasmuch as the attenuation of the energy passing through the material represents an absorption of energy, the system can be used merely to impart heat to the material.

Other objects and advantages of the present invention will readily occur to those skilled in the art to which the same relates.

What is claimed is:

1. Apparatus for treating a substance comprising: means for generating electromagnetic energy of a critical wavelength, characteristic of the nature of said substance in its molecular form, at which a strongly selective absorption occurs, said critical wavelength being longer than about .1 millimeter; means, receptive of a portion of the energy so generated, for maintaining said energy at a substantially constant power level; and means for propagating said energy through said substance.

2. Apparatus for treating a substance comprising: means for generating electromagnetic energy of a critical wavelength, characteristic of the nature of said substance in its molecular form, at which a strongly selective absorption occurs, said critical wavelength being longer than about .1 millimeter; means, receptive of a portion of the energy so generated, for maintaining said energy at a substantially constant power level; means for propagating said energy through said substance; and means, receptive of said energy after the same has passed through said substance, for determining the amount of said energy absorbed by said substance.

3. Apparatus for treating a substance comprising: means for generating electromagnetic energy of a critical wavelength, characteristic of the nature of said substance in its molecular form, at which a strongly selective absorption occurs, said critical wavelength being longer than about .1 millimeter; means for propagating said energy through said substance; means, receptive of said energy after the same has passed through said substance, for determining the amount of said energy absorbed by said substance; and means for eliminating the effect on said last-named means of changes in ambient temperature, whereby inaccuracy in the determination of the amount of energy absorbed by said substance is eliminated and the magnitude of the absorbed energy may be utilized to indicate the quantity of said substance being treated.

4. Apparatus for treating a substance comprising: means for generating electromagnetic energy of a critical wavelength, characteristic of the nature of said substance in its molecular form, at which a strongly selective absorption occurs, said critical wavelength being longer than about .1 millimeter; means, receptive of a portion of the energy so generated, for maintaining said energy at a substantially constant power level; means for propagating said energy through said substance; means, receptive of said energy after the same has passed through said substance, for determining the amount of said energy absorbed by said substance; and means for eliminating the effect on said last-named means of changes in ambient temperature, whereby inaccuracy in the determination of the amount of energy absorbed by said substance is eliminated and the magnitude of the absorbed energy may be utilized to indicate the quantity of said substance being treated.

5. Apparatus for treating a substance comprising: means for generating electromagnetic energy of a critical wavelength, characteristic of the nature of said substance in its molecular form, at which a strongly selective absorption of said energy occurs, said critical wavelength being longer than about .1 millimeter; a wave guide, receptive of said energy and receptive of said substance, for propagating said energy through said substance; a variable attenuating device associated with said wave guide, and disposed intermediate said first-named means and said substance; and thermally-responsive means, receptive of and operable by a portion of said energy, for controlling the operation of said attenuating device, whereby said energy is maintained at a substantially constant power level and said substance is exposed to uniform energy, whereby the energy absorbed by said substance may be utilized to indicate the quantity of said substance being treated.

6. Apparatus for treating a substance comprising: means for generating electromagnetic energy of a critical wavelength, characteristic of the nature of said substance in its molecular form, at which a strongly selective absorption of said energy occurs, said critical wavelength being longer than about .1 millimeter; means for propagating said energy through said substance; means for indicating the amount of said energy absorbed by said substance in terms of the quantity of said substance initially present; and thermally-responsive means, receptive of said energy after the same has passed through said substance and adapted to absorb the remaining energy, for controlling the operation of said indicating means.

7. Apparatus for treating a substance comprising: means for generating electromagnetic energy of a critical wavelength, characteristic of the nature of said substance in its molecular form, at which a strongly selective absorption of said energy occurs, said critical wavelength being longer than about .1 millimeter; a wave guide, receptive of said energy and receptive of said substance, for propagating said energy through said substance; a variable attenuating device associated with said wave guide, and disposed intermediate said first-named means and said substance; thermally-responsive means, receptive of and operable by a portion of said energy, for controlling the operation of said attenuating device, whereby said energy is maintained at a substantially constant power level, means for indicating the amount of said energy absorbed by said substance in terms of the quantity of said substance initially present; and thermally-responsive means, receptive of said energy after the same has passed through said substance and adapted to absorb the remaining energy, for controlling the operation of said indicating means.

8. Apparatus for treating a substance comprising: means for generating electromagnetic energy of a critical wavelength, characteristic of the nature of said substance in its molecular form, at which a strongly selective absorption of said energy occurs, said critical wavelength being longer than about .1 millimeter; means for propagating said energy through said substance; means for indicating the amount of said energy absorbed by said substance in terms of the quantity of said substance initially present; thermally-responsive means, receptive of said energy after the same has passed through said substance and adapted to absorb the remaining energy, for controlling the operation of said indicating means; and thermally-responsive means, cooperable with said last-named thermally-responsive means and disposed closely adjacent thereto, for eliminating the effect on said last-named thermally-responsive means of changes in ambient temperature, whereby inaccuracy in the determination of the amount of energy absorbed by said substance is eliminated and the magnitude of the absorbed energy becomes a true indication of the quantity of said substance initially present.

9. Apparatus for treating a substance comprising: means for generating electromagnetic energy of a critical wavelength, characteristic of the nature of said substance in its molecular form, at which a strongly selective absorption of said energy occurs, said critical wavelength being longer than about .1 millimeter; a wave guide, receptive of said energy and receptive of said substance, for propagating said energy through said substance; a variable attenuating device associated with said wave guide and disposed intermediate said first-named means and said substance; and thermally-responsive means, receptive of and operable by a portion of said energy, for controlling the operation of said attenuating device, whereby said energy is maintained at a substantially constant power level; means for indicating the amount of said energy absorbed by said substance in terms of the quantity of said substance initially present; thermally-responsive means, receptive of said energy after the same has passed through said substance and adapted to absorb the remaining energy, for controlling the operation of said indicating means; and thermally-responsive means, cooperable with said last-named thermally-responsive means and disposed closely adjacent thereto, for eliminating the effect on said last-named thermally-responsive means of changes in ambient temperature, whereby inaccuracy in the determination of the amount of energy absorbed by said substance is eliminated and the magnitude of the absorbed energy may be utilized to indicate the quantity of said substance being treated.

References Cited in the file of this patent

UNITED STATES PATENTS

| Number | Name | Date |
|---|---|---|
| 2,097,760 | Failla | Nov. 2, 1937 |
| 2,165,214 | Blau et al. | July 11, 1939 |
| 2,222,450 | Trost | Nov. 19, 1940 |
| 2,301,251 | Capen | Nov. 10, 1942 |
| 2,401,425 | Hershberger | June 4, 1946 |
| 2,422,873 | Wolfner | June 24, 1947 |
| 2,423,390 | Korman | July 1, 1947 |
| 2,455,940 | Muskat et al. | Dec. 14, 1948 |
| 2,455,941 | Muskat et al. | Dec. 14, 1948 |
| 2,456,800 | Taylor et al. | Dec. 21, 1948 |
| 2,457,673 | Hershberger | Dec. 28, 1948 |
| 2,463,297 | Muskat et al. | Mar. 1, 1949 |
| 2,508,321 | Wilmotte | May 16, 1950 |
| 2,551,756 | Mittelmann | May 8, 1951 |
| 2,609,510 | Wilmotte | Sept. 2, 1952 |

OTHER REFERENCES

Physical Review, February 15, 1934, vol. 45, page 234.

Short Wave and Television, April 1938, pages 669, 706 and 707.

Ph. D. Thesis entitled: "Ammonia Absorption Measurements with Guided Waves and the Shape of a Spectral Line" by H. S. Howe; submitted to University of Michigan 1940. (Copy may be obtained from the General Library of the University of Michigan.)